United States Patent [19]
Besser et al.

[11] Patent Number: 5,916,470
[45] Date of Patent: Jun. 29, 1999

[54] MICROWAVEABLE HEAT RETENTIVE RECEPTACLE

[75] Inventors: John E. Besser, Franklin; David L. Smith, Mt. Juliet, both of Tenn.

[73] Assignee: Aladdin Industries, LLC, Nashville, Tenn.

[21] Appl. No.: 08/781,630

[22] Filed: Jan. 10, 1997

[51] Int. Cl.⁶ .................................................. H05B 6/80
[52] U.S. Cl. .................. 219/730; 219/759; 219/732; 99/DIG. 14; 426/107; 426/234; 126/375
[58] Field of Search ..................... 219/730, 759, 219/725, 732, 734; 99/DIG. 14, 451; 426/107, 109, 234, 241, 243; 126/390, 375, 246

[56] References Cited

U.S. PATENT DOCUMENTS

| | | |
|---|---|---|
| Re. 34,929 | 5/1995 | Kristen . |
| 1,503,762 | 8/1924 | Mock . |
| 2,640,478 | 6/1953 | Flournoy . |
| 2,690,743 | 10/1954 | Flournoy . |
| 3,094,448 | 6/1963 | Cornelius . |
| 3,120,570 | 2/1964 | Kennedy et al. . |
| 3,155,260 | 11/1964 | Widener . |
| 3,256,101 | 6/1966 | Arns . |
| 3,331,522 | 7/1967 | Bridges . |
| 3,387,650 | 6/1968 | Hoffman et al. . |
| 3,603,106 | 9/1971 | Ryan et al. . |
| 3,684,123 | 8/1972 | Bridges . |
| 3,807,194 | 4/1974 | Bond . |
| 3,910,441 | 10/1975 | Bramming . |
| 3,941,967 | 3/1976 | Sumi et al. . |
| 4,182,398 | 1/1980 | Salyer et al. . |
| 4,182,405 | 1/1980 | Hysen et al. . |
| 4,182,457 | 1/1980 | Yamada et al. . |
| 4,183,435 | 1/1980 | Thompson et al. . |
| 4,184,601 | 1/1980 | Stewart et al. . |
| 4,217,161 | 8/1980 | Yamada et al. . |
| 4,246,884 | 1/1981 | Vandas . |
| 4,258,695 | 3/1981 | McCarton et al. . |
| 4,259,198 | 3/1981 | Kreibich et al. . |
| 4,304,106 | 12/1981 | Donnelly . |
| 4,316,070 | 2/1982 | Prosise et al. . |
| 4,319,629 | 3/1982 | Hotta . |
| 4,327,136 | 4/1982 | Thompson et al. . |
| 4,357,809 | 11/1982 | Held et al. . |
| 4,360,607 | 11/1982 | Thorsrud et al. . |
| 4,383,422 | 5/1983 | Gordon et al. . |
| 4,462,224 | 7/1984 | Dunshee et al. . |
| 4,466,553 | 8/1984 | Zenger . |
| 4,518,651 | 5/1985 | Wolfe, Jr. . |
| 4,567,877 | 2/1986 | Sepahpur . |
| 4,572,864 | 2/1986 | Benson et al. . |
| 4,617,332 | 10/1986 | Salyer et al. . |

(List continued on next page.)

OTHER PUBLICATIONS

Zubay, Geoffrey "Chapter 5: Lipids" in Biochemistry Second Edition, Macmillan Publishing Company, 1988, pp. 154–175.

Budavari et al.(eds), Entry No. 4384, "Glyceryl Monostearate" in *The Merck Index*, 1989, pp. 705–706.

Material Safety Data Sheet for "Eastman" 18–06K Distilled Monoglycerides, Kosher.

Battelle Solutions Update entitled, "Solutions Profile" from "http://www.batelle.org/solutions/profile.html", Dec. 28, 1996, last update indicated Jun., 1996.

Batelle Press Release entitled, "Batelle, R.G. Barry Develop "Heat Seat," Cushion Keeps You Warm Up to 8 Hours" from "http://www.batelle.org/pr/p4seat.html", Dec. 28, 1996, last update indicatedMar. 1995.

*Primary Examiner*—Philip H. Leung
*Attorney, Agent, or Firm*—Greenblum & Bernstein P.L.C.

[57] ABSTRACT

Microwaveable heat retentive receptacles comprising a volume for receiving a product, in heat exchange communication with a microwave absorbing material, wherein the microwave absorbing material preferably comprises monoglycerides, diglycerides, or mixtures thereof. Pouches containing the microwave absorbing material are also provided which can be associated with containers to provide improved heat storage characteristics.

20 Claims, 8 Drawing Sheets

U.S. PATENT DOCUMENTS

| | | |
|---|---|---|
| 4,685,588 | 8/1987 | Kobayashi . |
| 4,702,853 | 10/1987 | Benson et al. . |
| 4,704,510 | 11/1987 | Matsui . |
| 4,711,813 | 12/1987 | Salyer . |
| 4,714,445 | 12/1987 | Templeton . |
| 4,756,311 | 7/1988 | Francis, Jr. . |
| 4,764,390 | 8/1988 | Zukerman et al. ............... 426/438 |
| 4,765,393 | 8/1988 | Baxter . |
| 4,768,354 | 9/1988 | Barnwell . |
| 4,795,649 | 1/1989 | Kearns et al. . |
| 4,819,612 | 4/1989 | Okamoto et al. . |
| 4,888,459 | 12/1989 | Keefer . |
| 4,889,302 | 12/1989 | Tucker . |
| 4,900,886 | 2/1990 | Bridges . |
| 4,920,964 | 5/1990 | Francis, Jr. . |
| 4,937,412 | 6/1990 | Dobry . |
| 4,963,708 | 10/1990 | Kearns et al. . |
| 4,982,722 | 1/1991 | Wyatt . |
| 4,983,798 | 1/1991 | Eckler et al. . |
| 5,004,121 | 4/1991 | Howe . |
| 5,045,330 | 9/1991 | Pawlowski . |
| 5,049,714 | 9/1991 | Beresniewicz et al. . |
| 5,052,369 | 10/1991 | Johnson . |
| 5,053,446 | 10/1991 | Salyer . |
| 5,070,223 | 12/1991 | Colasante . |
| 5,076,463 | 12/1991 | McGraw . |
| 5,091,231 | 2/1992 | Parkinson . |
| 5,094,706 | 3/1992 | Howe . |
| 5,106,520 | 4/1992 | Salyer . |
| 5,107,087 | 4/1992 | Yamada et al. . |
| 5,124,519 | 6/1992 | Roy et al. . |
| 5,125,391 | 6/1992 | Srivastava et al. . |
| 5,144,106 | 9/1992 | Kearns et al. . |
| 5,145,090 | 9/1992 | Wyatt . |
| 5,205,277 | 4/1993 | Chao-Tsung . |
| 5,211,949 | 5/1993 | Salyer . |
| 5,220,141 | 6/1993 | Quick et al. . |
| 5,241,149 | 8/1993 | Watanabe et al. . |
| 5,241,150 | 8/1993 | Garvey et al. . |
| 5,252,793 | 10/1993 | Woods . |
| 5,254,380 | 10/1993 | Salyer . |
| 5,282,994 | 2/1994 | Salyer . |
| 5,294,763 | 3/1994 | Chamberlain et al. . |
| 5,314,005 | 5/1994 | Dobry . |
| 5,329,778 | 7/1994 | Padamsee . |
| 5,362,504 | 11/1994 | Kamper et al. ..................... 426/89 |
| 5,403,998 | 4/1995 | Sheen et al. . |
| 5,416,305 | 5/1995 | Tambellini . |
| 5,417,276 | 5/1995 | Dobry . |
| 5,421,473 | 6/1995 | McCrossen . |
| 5,424,519 | 6/1995 | Salee . |
| 5,454,471 | 10/1995 | Norvell . |
| 5,478,988 | 12/1995 | Hughes et al. . |
| 5,494,598 | 2/1996 | Hughes . |
| 5,508,498 | 4/1996 | Rheinish et al. . |
| 5,513,629 | 5/1996 | Johnson . |
| 5,515,995 | 5/1996 | Allen et al. . |
| 5,520,103 | 5/1996 | Zielinski et al. . |
| 5,560,856 | 10/1996 | Dobry . |
| 5,565,132 | 10/1996 | Salyer ................................. 252/70 |
| 5,573,693 | 11/1996 | Lorence et al. . |
| 5,596,921 | 1/1997 | Kuwana et al. . |
| 5,601,744 | 2/1997 | Baldwin .- |

MICROWAVEABLE HEAT RETENTIVE RECEPTACLE

BACKGROUND OF THE INVENTION

1. Field of the Invention

This invention relates to microwaveable thermodynamic receptacles or containers. More specifically, this invention relates to containers adapted to maintain their contents at elevated temperatures for extended periods of time. Thermodynamic containers of this invention include a microwave-absorbing composition in heat exchange relationship with the container contents and preferably in the space defined by the inner and outer walls of the container. Upon exposure to microwave energy, the composition absorbs energy in the form of microwaves, which is retained in the composition in the form of thermal energy. The thermal energy can then be transferred into the contents of the container, such as a food or beverage, thereby maintaining the contents at an elevated temperature for an extended period of time.

2. Background of the Invention and Related Art

Maintaining the temperature of a food or beverage after cooking or preheating has long been of interest in food and beverage service. In the domestic, recreational, field, and commercial environments (among others), maintenance of temperature is desirable when the food or beverage is served after cooking or preheating. In commercial environments, food service pans are often placed over a tray of boiling water or over some other heating means to maintain the temperature of the food after preparation. In the home, it is common for a casserole dish to be placed into a wicker basket or wrapped in a cloth towel to insulate the container and maintain the desired temperature of the contents. For the same purpose, electrically heated trivets, or preheated hot-pads, are sometimes used in the home as well.

It is often desirable to be able to consume a food or beverage, prepared earlier, at some location removed from the home, such as at the workplace. In these circumstances, it is often desirable to place food into a portable container which can be easily carried to a separate location where the food can later be consumed. In some environments, such as in remote wilderness locations, or at some sporting events, it can be impossible or impractical to reheat the food or beverage prior to consumption. In these instances, it is both pleasing and convenient to open the container at some later period and find that the food or beverage has been maintained at a desirable temperature.

Portable containers which serve this purpose have been known for years. Early containers which served this purpose include bottles or other containers insulated with a foam insulation such as foamable foam polystyrene, e.g., STYROFOAM, or foamable foam polyurethane. Although these containers extend the time a food or beverage may be maintained at an elevated temperature, they do not provide the level of temperature maintenance desired in many instances.

Foam insulated beverage containers have also been known for years. A recent advance in double walled foam insulated beverage containers is disclosed in U.S. Pat. No. 5,515,995, to ALLEN et al. This patent discloses a double walled, foam insulated beverage container having a wide base. This patent, and U.S. Pat. No. 3,684,123, to BRIDGES, cited therein, are hereby incorporated by reference as though set forth in full herein.

In general, vacuum insulated bottles are far superior to those insulated with foam. U.S. Pat. No. 3,331,522, to BRIDGES, which is hereby incorporated by reference as though set forth in full herein, describes a vacuum insulated bottle comprising a metal vacuum bottle enclosed in a plastic jacket.

To enhance the ability of the vacuum bottle itself to insulate, attempts were made to utilize different materials for the vacuum bottle. Although fragile, glass is superior to metal in its lack of thermal conductivity, and thus glass vacuum containers became popular for use in thermally insulated containers.

To further enhance the insulating properties of the glass vacuum container, attempts were made to line the glass vacuum containers with reflective coatings to minimize radiant heat loss. U.S. Pat. No. 3,910,441, to BRAMMING, is illustrative. BRAMMING discloses a glass vacuum bottle construction in which the interior walls are silver-coated to reduce heat loss.

With the advent of microwave cooking technology and its rapid acceptance and popularity, the need arose for a thermally insulated bottle which could be used in a microwave oven. However, because metals absorb significant microwave energy, they can become dangerously hot in a microwave oven. In addition, metals and coatings containing metals, such as silver coatings, can damage the microwave oven magnatron tube by reflecting microwave energy back into the wave guide, and by "arcing" and/or sparking.

U.S. Pat. No. 4,184,601, to STEWART et al., which is hereby incorporated by reference as though set forth in full herein, relates to a microwave-safe vacuum insulated container. The STEWART container utilizes a glass vacuum container. However, instead of a silver lining to reduce radiant heat loss, the annular space of the glass container is substantially filled with finely divided materials which are neither electrically conductive nor absorbent of electromagnetic energy at microwave frequencies. Examples of such materials include finely divided silica and calcium carbonate.

While the vacuum containers which are known in the art are certainly able to conserve the heat of their contents, a continuing need for improvement remains. Most commercially-available vacuum containers known in the art allow a significant loss of thermal energy at a measurable rate. The ability of the container to maintain the heat of its contents is measured by the rate of thermal energy loss (heat loss/unit of time), which can be considered its thermal efficiency. A need exists for improved thermal efficiency in a microwaveable container.

The present invention enhances the ability of the thermally insulated container to maintain contents at elevated temperatures. Vacuum containers are directed to conserving the thermal energy already present in the contents of the container. The present invention transfers thermal energy into the contents, adding to the thermal energy of the contents, and thereby keeping the contents at a higher temperature for extended periods of time.

The concept of a container which can be preheated to add thermal energy to the contents is not new. For example, U.S. Pat. No. 4,567,877, to SEPAHPUR, discloses a heat storage food container, adapted to be used in microwave ovens. SEPAHPUR uses wet sand as the thermal storage medium. However, an obvious drawback to the SEPAHPUR container is that water undergoes a phase transition (from liquid to gas) upon heating in the range necessary for food preparation. Upon the phase change from liquid to gas, the molecules occupy a significantly greater volume. Consequently, the heat storage container must be engineered to structurally accommodate such changes.

U.S. Pat. No. 5,052,369, to JOHNSON, which is hereby incorporated by reference as though set forth in full herein, also discloses a heat retaining food container adapted for microwave use. Unlike SEPAHPUR, the microwave absorbing material of JOHNSON is a mixture of micro crystalline wax which exhibits a fusion temperature (melting point) between 175° F. and 300° F. However, these temperatures are well above those at which food or beverages are often consumed.

In addition to wax, other heat storage materials have been employed as well. For example, U.S. Pat. No. 4,983,798, to ECKLER et al., discloses the use of materials which undergo a "mesocrystalline" phase change in the solid state prior to melting, such as pentaerythritol and neopentyiglycol. U.S. Pat. No. 5,424,519, to SALEE, discloses the use of "wax in liquid" or "oil in liquid" emulsions to act as a heat storage devices. This patent discloses that these materials may be heated by microwave energy to, e.g., 30°–90° C. by exposing to microwave energy at 700 to 750 watts for approximately 3 to 15 minutes. U.S. Pat. No. 5,282,994, to SALYER, discloses a heat storage composition comprising a phase change material which can include polar materials such as glycerine, ethylene glycol, and polyethylene glycol. Each of these patents is hereby incorporated by reference as though set forth in full herein.

Commercially available standard microwave ovens for domestic use in the home typically are rated as having an "output" of, for example, on the order of from about 600 to about 1,000 watts. Typical commercial "convenience" foods are specifically designed to be heated to or near a desired or serving temperature (e.g., perceived to be desirable by the typical adult) in from about 2 to about 6 minutes. Consequently, it is believed that typical users of microwave ovens in domestic settings desire or expect to employ a microwave oven to heat the contents of a container to a desired serving temperature in a period of time of from about 2 to about 6 minutes.

SUMMARY OF THE INVENTION

In view of the foregoing, it is an object of the present invention to provide a microwave heatable material which exhibits a desirable response to microwave radiation.

It is another object of the present invention to provide articles which employ such materials and which can thereby be kept warm by exposure of such materials to microwave radiation.

It is another object of the present invention to provide containers which employ such materials and whose contents can thereby be kept warm by exposure of such materials to microwave radiation.

It is another object of the present invention to provide such a container wherein the container can be heated either with or without the contents of food therein and still function as a thermal battery in either case to reduce the net loss of heat from the contents.

It is another object of the present invention to provide a container wherein the container can be heated by microwave energy either with or without the contents of food therein during a period of time which is acceptable to, and in fact expected by domestic users, and still function as a thermal battery to reduce the net loss of heat from the contents, while at the same time avoiding overheating of components of the container, such as by overheating of the microwave susceptible portion of the container.

It is another object of the present invention to provide a microwaveable container which maintains the temperature of its contents at a higher temperature over time than other commercially available containers.

It is another object of this invention to provide a microwaveable container which contains a microwave-absorbing material which, when exposed to microwave energy, heats at an optimum rate to an acceptable temperature without causing damage to the surrounding container.

It is another object of this invention to provide a microwaveable container which contains a microwave-absorbing material which may be solid at room temperature, but can undergo transition between phases, yet does not change volume significantly. An advantage of such a material is that the container itself need not be specially engineered to accommodate a volumetric expansion.

It is a further object of the invention to provide a microwaveable container which contains a microwave-absorbing material which is inherently "microwave active," and does not require the presence of another material, such as water. An advantage of such a material is that it does not lose moisture and "dry out" with repeated microwaving. Consequently, the lifetime of the microwaveable pouch and container are significantly increased. Moreover, the material can be simply and easily used in the container with reduced manufacturing costs.

It is another object of this invention to provide a microwaveable container which radiates thermal energy into its contents, thereby allowing the contents to be maintained at a higher temperature than possible with a comparable vacuum container, yet is thermally insulated on the exterior, preventing outward radiant heat loss.

It is another object of this invention to provide a portable thermally insulated bottle which can be heated in a typical microwave oven available to consumers prior to receiving its heated contents, and thereby maintain the heated contents at an acceptable temperature.

It is another object of this invention to provide serving containers, such as bowls or serving dishes, for home or commercial use, which can be microwaved prior to receiving their contents, and thereby maintain a higher temperature of their contents, in comparison with other commercially available containers.

It is another object of this invention to provide serving containers, such as carafes or pots, for home use, which can be microwaved prior to receiving their contents, and thereby maintain a higher temperature of the contents, in comparison with other commercially available containers.

It is another object of the present invention to provide a microwaveable composition which heats easily upon microwave energy absorption, yet does not substantially overheat if overmicrowaved, and yet further, exhibits a thermal capacity sufficient to change the shape of the thermal loss curve compared to containers lacking such compositions, and still further, is nontoxic if exposed to the consumer.

It is another object of the present invention to provide a microwaveable heat storage container constructed from durable materials (without the glass vacuum container), which is thereby more useful to the consumer.

It is another object of the present invention to provide a modular pouch containing a microwaveable composition which can replace the vacuum insulation in thermally insulated containers.

It is another object of the present invention to provide a modular pouch containing a microwaveable composition which can be used in medical applications for warming parts of a body.

It is another object of the present invention to provide a modular pouch containing a microwaveable composition which can be used in clothing to be worn in cold weather, to aid in warming a body.

These and other objects of the invention are achieved by providing a microwaveable material which exhibits desirable properties in response to microwave radiation.

These objects have been achieved by providing articles which employ such materials and which can thereby be kept warm by exposure of such materials to microwave radiation.

These objects have been achieved by providing containers which employ such materials and whose contents can thereby be kept warm by exposure of such materials to microwave radiation.

These objects are also achieved by the provision of a microwaveable container including an inner shell adapted to receive a food or beverage product, an outer shell enveloping the inner shell and forming a cavity therebetween, and a microwave-absorbing composition contained in the cavity between the inner and outer shell.

These objects are also achieved by the provision a microwaveable heat retentive container comprising at least one portion for receiving a material; and a microwave absorbing material in heat exchange communication with the portion for receiving the material, wherein the microwave absorbing material is selected from the group consisting of monoglycerides, diglycerides, and mixtures thereof. The microwave absorbing material is preferably a monoglyceride comprising a fatty acid ester, having a fatty acid moiety of from 14 to 20 carbons, preferably from 16 to 18 carbons, and is preferably selected from glyceryl monostearate, glyceryl monopaimitate, and mixtures of the foregoing.

The microwave absorbing material is preferably disposed within a microwave absorbing material storage volume, which can be of various shapes such as substantially tubular, annular, or it may be disposed at a bottom portion of the container, and preferably in association with a bottom wall portion of the container. The microwave absorbing material storage volume can comprise a pouch.

The microwaveable heat retentive container wall portion can include a cavity and the microwave absorbing material is preferably disposed within the cavity.

In other aspects, a microwaveable heat retentive container for heated foods or beverages, is provided comprising an outer shell, an inner wall positioned within the outer shell, and a material susceptible to heating by microwave radiation, the material having a time/temperature profile such that, when from approximately 30–90 grams of the material, preferably 40–80 grams, more preferably 50–70 grams, and most preferably 60 grams, is subjected to microwave radiation. Preferably, the radiation is at a frequency of from approximately 2,300–2,600 MHz, more preferably 2,400–2,500 MHz, most preferably 2,450 MHz. Preferably the microwave power is from approximately 600–1,000 W, more preferably 750–1,000 W. Preferably, the time of heating in the microwave oven is approximately 2–7 minutes, more preferably 3–6 minutes, more preferably 5–6 minutes. Under such conditions, the material is heated to a temperature of approximately 90° C.–113° C.

Preferably the outer shell is substantially microwave transparent and can comprise polypropylene. As above, the material susceptible to heating by microwave radiation is preferably contained within a pouch, as described above. Preferably the inner shell is microwave transparent and preferably comprises polypropylene.

In the foregoing embodiments, the cavity further comprises an insulating means to reduce outward radiant heat loss, which can include, an evacuated space, insulating foam material, such as polyurethane foam, polystyrene foam, etc.

In other aspects, these objects are attained by providing a microwaveable heat retentive container comprising at least one portion for receiving a material, and defining a volume; and a mass of microwave absorbing material in heat exchange communication with the at least one portion for receiving a material.

The ratio of the mass of the microwave absorbing material, in grams, to the volume of the receiving portion, in milliliters, is from about 1:5 to about 1:13, preferably from about 1:6 to about 1:12, more preferably from about 1:8 to about 1:10, and most preferably from about 1:9 to about 1:10.

BRIEF DESCRIPTION OF THE DRAWINGS

The foregoing and other objects, features, and advantages of the invention will be apparent from the following more particular description of the preferred embodiments, as illustrated in the accompanying drawings, in which reference characters refer to the same, or like, parts throughout the various views, and wherein.

DETAILED DESCRIPTION OF PREFERRED EMBODIMENTS OF THE INVENTION

The microwave absorbing materials of the invention can be employed in any type of article, e.g., receptacle or container. The microwave absorbing materials are preferably, although not necessarily, disposed in a pouch. The pouch can then be employed in conjunction with articles, including receptacles or containers to provide various other embodiments of the invention, specific examples of which are discussed below.

Figure 1:
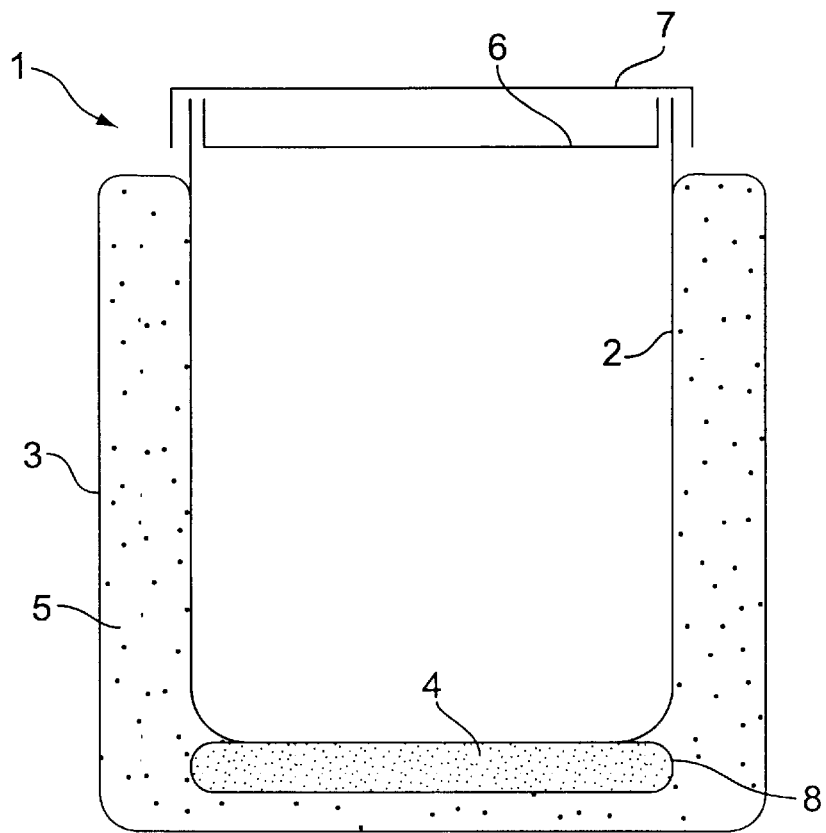
FIG. 1 is a schematic cross-sectional view of a heat retentive food jar assembled according to the invention.

FIG. 1 discloses a microwaveable heat retentive container according to this invention, designated generally as 1. The container preferably has an inner shell, or liner 2, and an outer shell 3. The inner shell or liner 2 and the outer shell 3 may be formed of any suitable material well known to those of ordinary skill in the art such as polyethylene, polypropylene, polycarbonate, and acrylonitrile butadiene styrene copolymer. Polyolefins formed from monomers having from 2 carbons to 4 carbons are preferred. Polypropylene is most preferred. As used herein, the terms inner shell and liner can be used interchangeably to refer to the innermost wall of the container, i.e., the wall which actually contacts the contained food. It is preferable that the inner shell be thermally conductive. In addition, it is preferable that the inner shell consist of materials which are microwave transparent. Thus, the inner shell may be composed of a material which can withstand heating up to approximately 150° C. without structural damage. Suitable materials include plastics. Preferably the inner shell is composed of a polypropylene. Preferably the inner shell is composed of a nucleated polypropylene homopolymer. As used herein, the term nucleated polypropylene homopolymer refers to a polypropylene polymer in which agents are added to increase the rate of crystallization of the polymer. A suitable nucleated polypropylene homopolymer is ACCPRO, available from Amoco Plastics.

The container of FIG. 1 preferably comprises an outer shell, or jacket 3. As used herein, the terms outer shell and jacket are meant to describe the same structural feature. In addition, it is preferable that the outer shell consist of materials which are microwave transparent. It is preferable that the outer shell be composed of a material which will withstand heating up to approximately 150° C. without structural damage. The outer shell is preferably formed of a plastic material, more preferably the outer shell is composed of polypropylene. Most preferably the outer shell is composed of a polypropylene homopolymer.

The inner and outer shell can be affixed or connected to each other by any means well known to those of ordinary skill in the art, such as by a snap fit construction, or by welding, including solvent welding, spin welding, sonic welding, etc., and U.S. Pat. Nos. 5,515,995, to ALLEN et al., 3,684,123, to BRIDGES, 4,184,601, to STEWART et al. (each incorporated by reference above) disclose suitable fabrication techniques. The container of FIG. 1 further comprises a pouch 8 containing a microwave absorbing material 4. The pouch is preferably composed of materials which are microwave transparent, such as a polyolefin. The pouch in which the microwave absorbing material is placed is preferably formed of polyethylene, e.g., linear low density polyethylene, polypropylene, nylon, polyester, and most preferably polypropylene. In preferred embodiments, the microwave absorbing material substantially fills the pouch.

Figure 13:
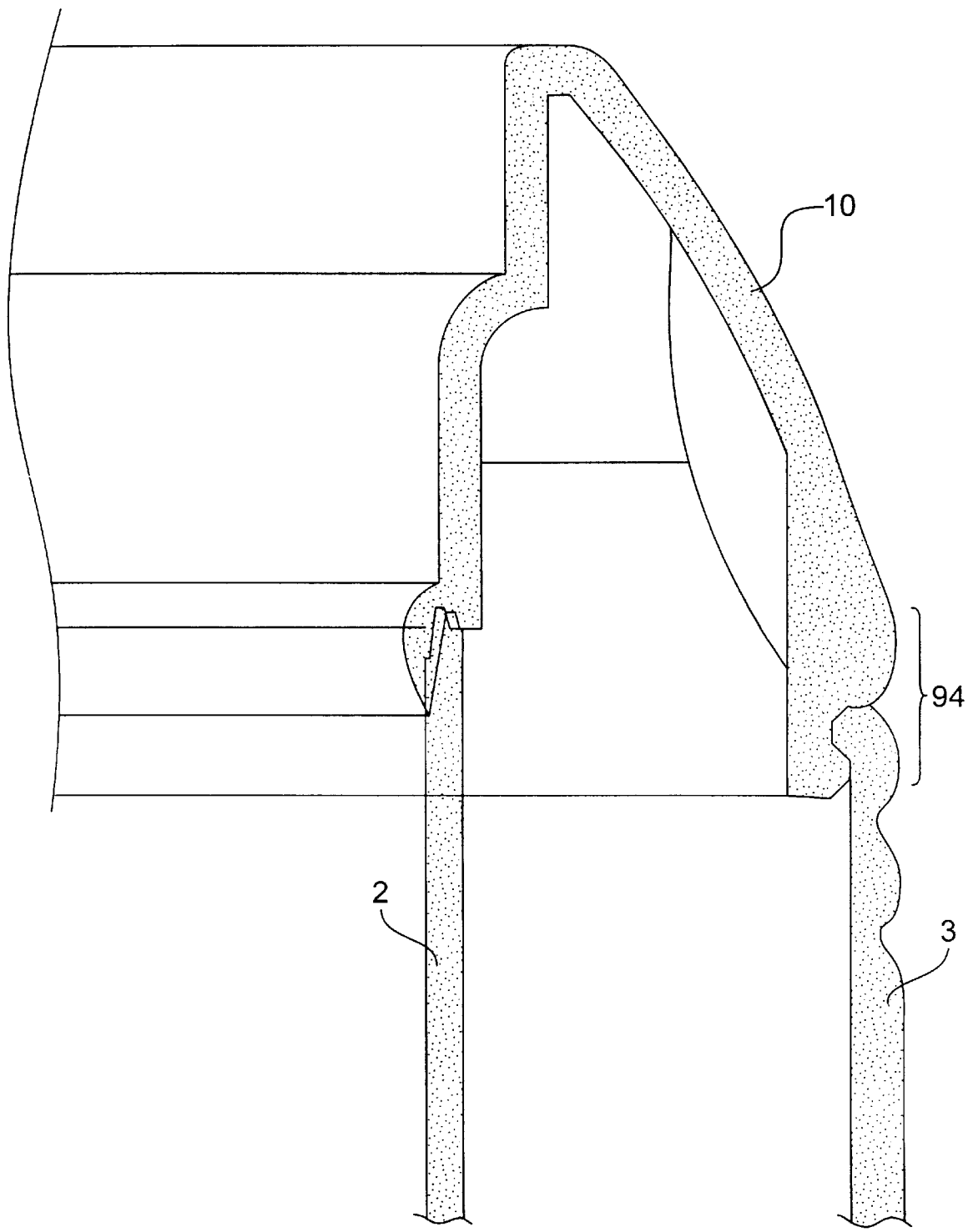
FIG. 13 an enlarged cross-sectional representation of one way in which the inner liner 2 may be attached to the outer shell 3.

A suitable means by which inner liner 2 may be affixed to outer shell 3 by means of a snap fit construction is shown in FIG. 13. The snap fit portion of the construction is designated generally 94. As shown, the outer shell 3 is attached to inner liner 2 by means of an intermediate upper collar 10. The inner liner 2 may be attached to intermediate collar 10 by any means known to one of ordinary skill in the art and preferably by spin welding.

Figure 12:
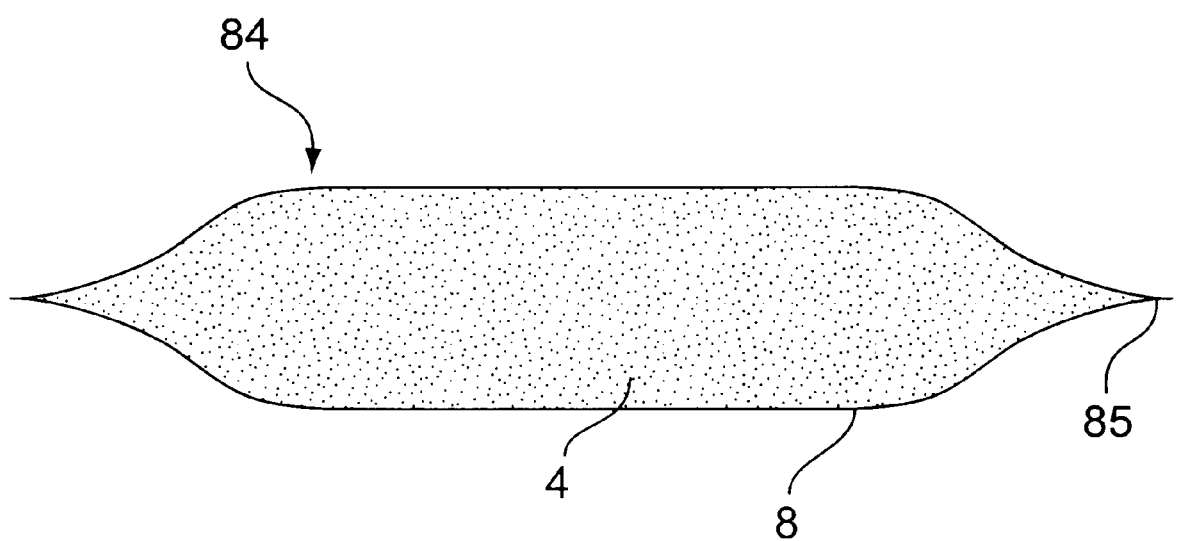
FIG. 12 is a schematic, cross-sectional representation of a microwaveable pouch according to the invention.

The pouch 8 may be fabricated by any means suitable to those of ordinary skill in the art, such as by heat sealing. As shown in FIG. 12, the pouch 8 comprises marginal portions, which are preferably heat sealed by sealing the marginal portions or edges 85 with heat and pressure by means well known to those of ordinary skill in the art. U.S. Reissue Pat. No. RE 34,929, to TILIA, Inc., relates to such systems and is hereby incorporated by reference as though set forth in full herein.

The microwave absorbing composition can be selected based on its time/temperature profile. Preferred microwave absorbing materials do not depend on a liquid to solid phase change to maintain thermal efficiency. It is preferable to select a microwave absorbing compound which exhibits a high heat capacity, and is capable of absorbing microwave energy. In this regard, it is a feature of the invention that the microwave absorbing material may be employed in accordance with the invention without the need to employ adjuvants or additives to alter the response of the microwave absorbing material to microwave energy. Preferably, the microwave absorbing material contains hydroxyl (—OH) groups, which are believed to be involved in the absorption of microwave energy due their polarity or the net dipole moment of the molecule containing such a substituent. In preferred embodiments, the microwave absorbing composition contains two hydroxyl groups per molecule. The microwave absorbing material is preferably a glycerol derivative, having a 3 carbon backbone. Preferably, the glycerol is esterified at one of the three carbons, forming a monoglyceride. The esterifying moiety is preferably a fatty acid having a carbon chain length of from about 14 to about 20 carbons. More preferably, the esterified fatty acid chain length is from about 16 to about 18 carbons. Preferred embodiments also include mixtures of monoglycerides in which the length of the fatty acid chain varies depending on the components of the mixture. The most preferred monoglyceride is glyceryl monostearate. Other preferred microwave absorbing materials include glycerol derivatives which are esterified with fatty acids at two of the three carbons, forming diglycerides.

Preferred microwave absorbing materials can be structurally represented by the following formulas:

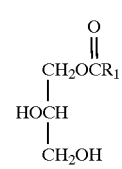

I

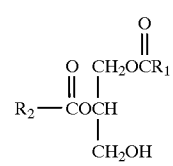

II

Formula I above is a diagrammatic structural formula which is representative of a monoglyceride which can be used according to the invention. Preferably, the $R_1$ group of formula I is a hydrocarbon chain with a length of from about 14 to about 20 carbons. More preferably, the $R_1$ hydrocarbon chain length ranges from about 16 to about 18 carbons. In another preferred embodiment, the microwave absorbing material is a mixture of monoglycerides in which $R_1$ of formula I varies in length from about 14 to about 20 carbons.

Formula II above is a diagrammatic structural formula which is representative of a diglyceride which can be used according to the invention. Preferably, the $R_1$ and $R_2$ groups of formula II are independently, hydrocarbon chains with lengths ranging from 14 to 20 carbons. More preferably, the hydrocarbon chain lengths of $R_1$ and $R_2$ range from 16 to 18 carbons. In another preferred embodiment, the microwave absorbing material is a mixture of diglycerides in which $R_1$ and $R_2$ of formula II vary in length from 14 to 20 carbons.

Formulas I and II above are meant to assist in understanding the structure of some of the materials which are preferred embodiments of the invention and are intended in an illustrative rather than limiting sense. Although the preferred R moieties are shown as attached to the glycerol backbone via ester linkages, ether linkages are also contemplated according to the present invention. The structures of mono- and diglycerides are presented in Chapter 5, "Lipids," pages 154–175 of *Biochemistry, Second Edition*, by Geoffrey Zubay, Macmillan Publishing Company, 1988. For its discussion of lipids and their structure, the entire Chapter 5 is hereby incorporated by reference as though set forth in full herein.

In preferred embodiments, the mass of the microwave absorbing material is that which, when exposed to microwave radiation in the range of approximately 2,300 to 2,600 MHz, at a power of approximately 600 to 1,000 W, for a period of approximately 2 to 7 minutes, heats to a temperature of approximately 90° C.–113° C. More preferably, the microwave radiation is in the range of approximately 2,400 to 2,500 MHz, and in the most preferred embodiment, the microwave energy is at approximately 2,450 MHz. The microwave power more preferably falls within the range of approximately 750 to 1,000 W. The time of heating at these settings is more preferably approximately 3 to 6 minutes, more preferably approximately 4 to 6 minutes, and is most preferably approximately 5 to 6 minutes. Of course, when the microwave absorbing material is exposed to microwave energy at a power of 1,000 W, the time of heating will likely be less, for example, approximately 5 minutes. Conversely, at a lower power, for example 600 W, the heating of the microwave absorbing material could take as long as 7 minutes.

The mass of the microwave absorbing material is preferably chosen based on the volume of the container with which it is associated. Preferably, the ratio of the mass of microwave absorbing material, in grams, to the volume of the container, in milliliters, is from about 1:6 to about 1:12. More preferably, the ratio is from about 1:8 to about 1:10. In the most preferred embodiment, the ratio is from about 1:9 to about 1:10. For example, for a 500 milliliter container, the mass of the microwave absorbing material is preferably between approximately 30 and 90 grams. More preferably, the mass of the microwave absorbing material ranges from approximately 45 to 75 grams. In the most preferred embodiment, the mass of the microwave absorbing material is 60 grams. Of course, the higher the mass of the microwave absorbing material, the longer the time necessary to heat to the desired temperature. However, increasing the mass of the microwave absorbing material above approximately 60 grams does not significantly enhance the heat retentive properties of the container. Therefore, the most preferred embodiment, 60 grams, is selected by balancing heating time with the performance of the microwave absorbing material in the finished container.

Preferably, microwaveable heat retentive containers of the invention can, upon preheating the container and placing food or beverage at a temperature of at least approximately 82° C. into the container, maintain the heat of the contents to at least approximately 54° C.–55° C., after about six hours in the container, whether the container is heated empty, i.e., without contents therein, or full, i.e., with the contents therein.

The container of FIG. 1 further comprises insulation 5, preferably foam insulation. In preferred embodiments, the foam insulation is a polyurethane foam. The container of FIG. 1 further comprises a two-piece closure assembly, comprising an inner stopper 6, and an outer lid 7. In preferred embodiments, the closure assembly is formed of plastic materials. More preferably the closure assembly is composed of polypropylene. Preferably the closure assembly is composed of a polypropylene homopolymer.

Figure 3:
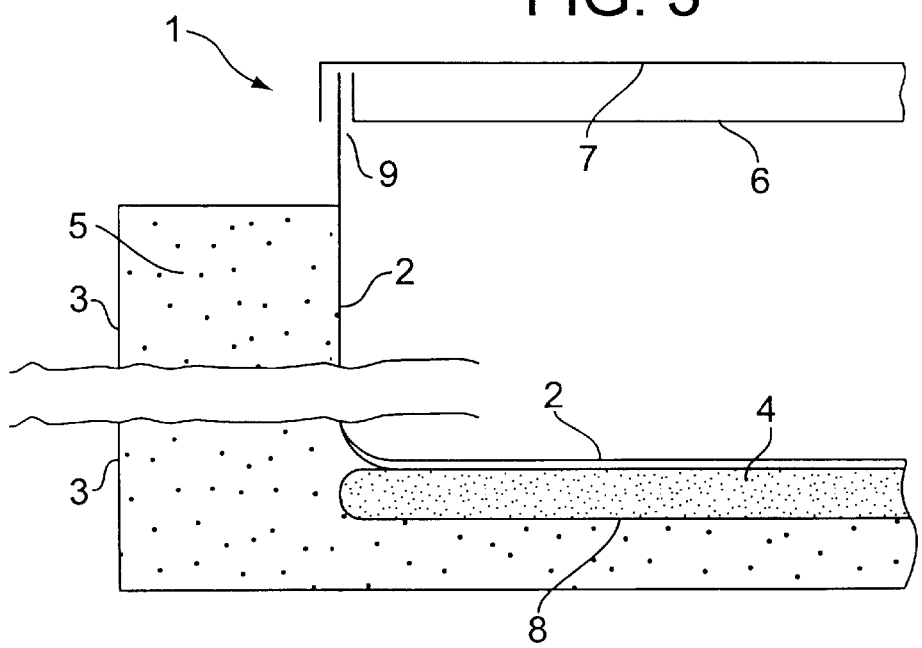
FIG. 3 is an enlarged cross-sectional view of the food jar shown in FIG. 1, with a portion broken away.

Portions of the container shown in FIG. 1 are shown in greater detail in the cross-sectional view of FIG. 3. FIG. 3 shows the relationship between the pouch 8 containing the microwave absorbing material 4 and the inner shell 2, the foam insulation 5, and the outer shell 3. FIG. 3 also shows schematically the relationship between the stopper 6, the inner shell 2, the outer shell 3, and the lid 7. Stoppers 6 may be employed to seal the container by any means known to those of ordinary skill in the art, such as threading 9 or friction fit, in conjunction with standard seals, gaskets, and the like.

Figure 4:
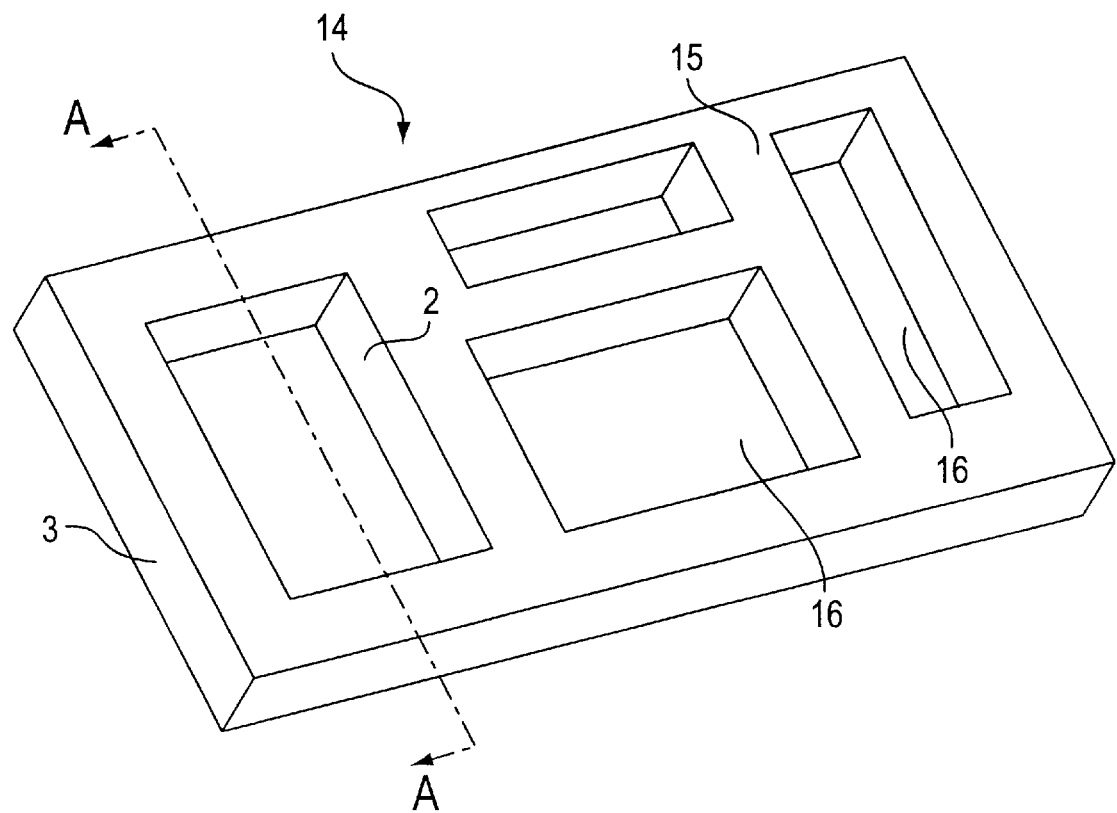
FIG. 4 is a perspective view of a food service tray according to the present invention.
Figure 5:
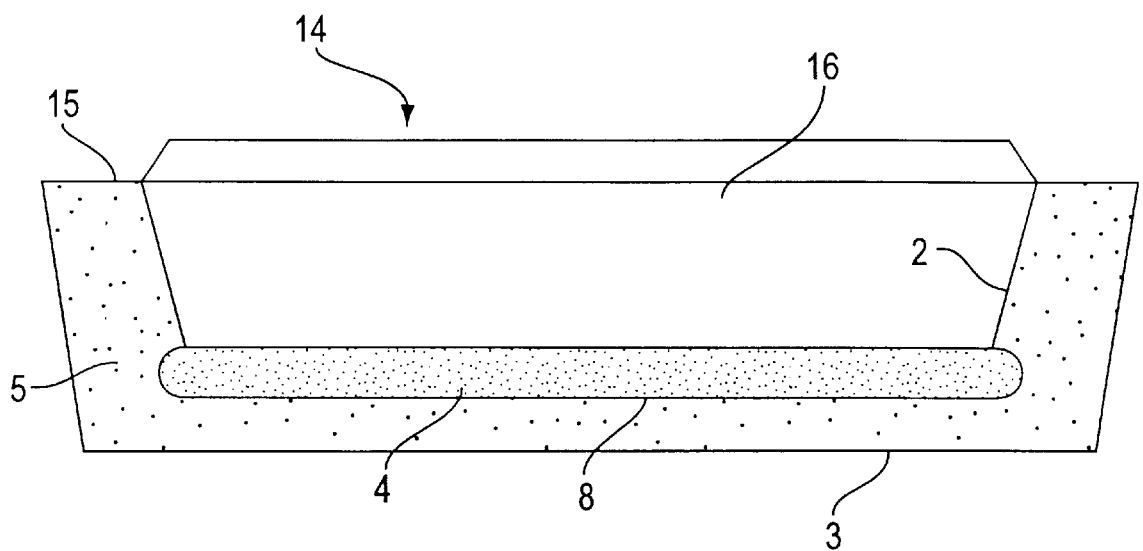
FIG. 5 is a cross-sectional view of the food service tray of FIG. 4, taken along the line A—A.

FIGS. 4 and 5, respectively, show perspective and cross-sectional views of a microwaveable heat retentive food service tray assembled according to the invention, generally designated 14. The food service tray 14 comprises a tray top 15. The food service tray 14 further comprises an outer shell 3 and an inner shell 2. The outer shell 3 and inner shell 2 can be assembled by any system known to those of ordinary skill in the art such as by way of a snap fit construction and the interior can be filled with foam 5, all of the foregoing being performed as taught in U.S. Pat. No. 5,145,090 to Wyatt, which patent is hereby incorporated by reference as though set forth in full herein. The tray top 15 and the inner shell 2 of the food service tray are formed in a manner to define separate food compartments 16. In a preferred embodiment, those compartments which are intended to contain hot foods, are placed adjacent a pouch containing the microwave absorbing material 4. In a preferred embodiment, approximately 30 to 90 grams of the material is used, the amount selected based on the volume of the compartment. The tray top 15 and the inner shell 2 can be formed continuously of the same piece of plastic material. In a preferred embodiment, the food service tray 14 further comprises foam insulation 5 which fills the remaining space of the cavity formed by the inner shell 2, tray top 15, and outer shell 3. In a preferred embodiment of the invention, those compartments which are intended to hold hot foods are filled with those foods, and the tray 14 is then microwaved for approximately 2 to 7 minutes at approximately 600 to 1,000 watts. After heating in the microwave oven, the tray is removed, and those compartments intended for cold foods are filled. In such an embodiment, the tray keeps the hot foods hot and the cold foods cold.

Figure 6:
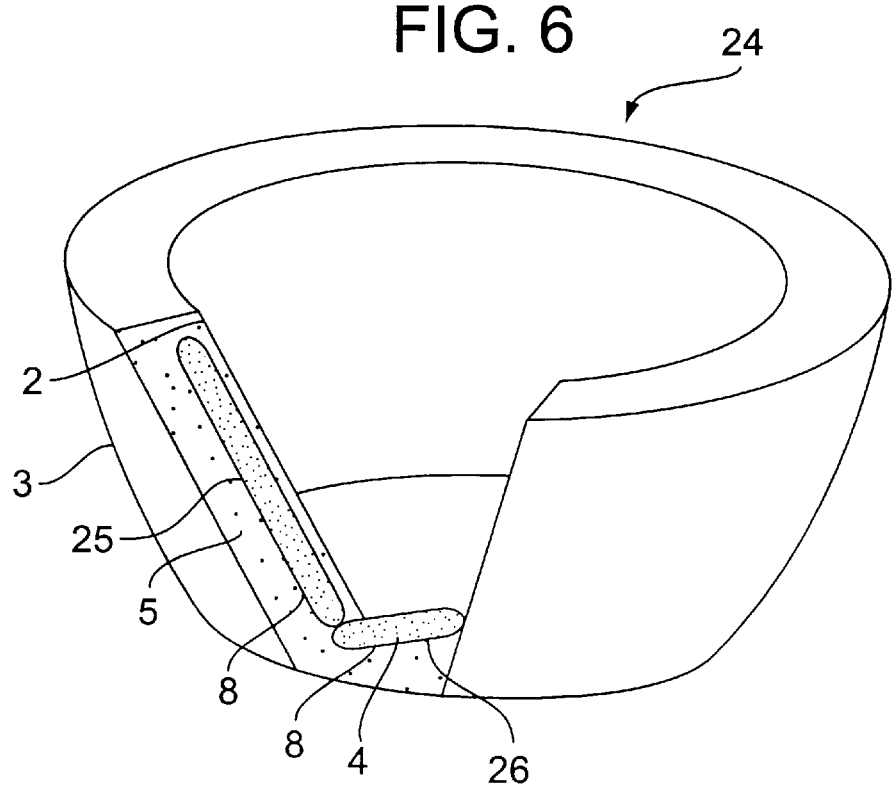
FIG. 6 is a perspective view of a serving container with a portion cut away to show an assembly according to the invention.

FIG. 6 shows another embodiment of the invention, a microwaveable heat retentive serving container, generally designated 24. The serving container 24 comprises an inner shell 2 which is bowl-shaped. The serving container 24 further comprises an outer shell 3 which is substantially bowl-shaped as well. Because of the size and shape of the serving container, it is preferred to place pouches 8 containing the microwave absorbing material 4 both in the sides 25 of the serving container and in the bottom 26 of the serving container. In addition, the serving container 24 further comprises a foam insulating material 5. In a preferred embodiment, the mass of the microwave absorbing material 4 in the bottom 26 is preferably 60 grams, and four pouches, each containing 30 grams, are distributed around the sides 25 of the serving container 24. In a preferred embodiment, the serving container 24 is placed in a microwave oven prior to being filled with food. The serving container 24 is heated for approximately 2 to 7 minutes at approximately 600 to 1,000 watts. Upon removal from the microwave oven, the container 24 is filled with food to be served. In another preferred embodiment, the empty serving container 24 is filled with the food to be served prior to placement in the microwave. In this embodiment, neither the serving container 24 nor the food is heated prior to placement in the microwave oven. In this embodiment, both the food and serving container 24 are heated simultaneously in the microwave for approximately 2 to 7 minutes at approximately 600 to 1,000 watts. The serving container 24 containing the hot food is then removed from the microwave oven for serving.

Figure 7:
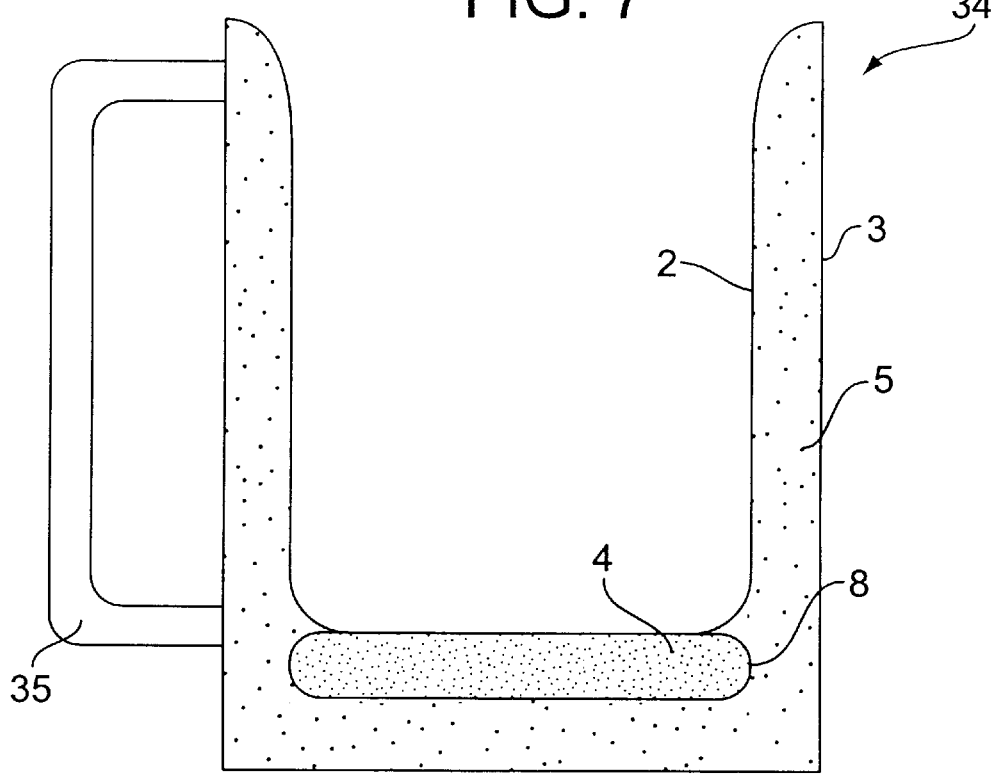
FIG. 7 is a cross-sectional view of a beverage mug according to the invention.

FIG. 7 shows another embodiment of the invention, a microwaveable heat retentive beverage mug, generally designated 34. The mug 34 comprises an inner shell 2, an outer shell 3, a pouch 8 containing a microwave absorbing material 4, and an insulating material 5. The mug 34 also has a handle 35 for ease of use. In a preferred embodiment, the mug 34 has a capacity of 12 to 20 fluid ounces and has a single 60-gram pouch 8 of microwave absorbing material in the base. The mug may be preheated in a microwave oven prior to receiving its contents. Alternatively, the mug may be filled and then heated together with its contents in a microwave oven.

Figure 8:
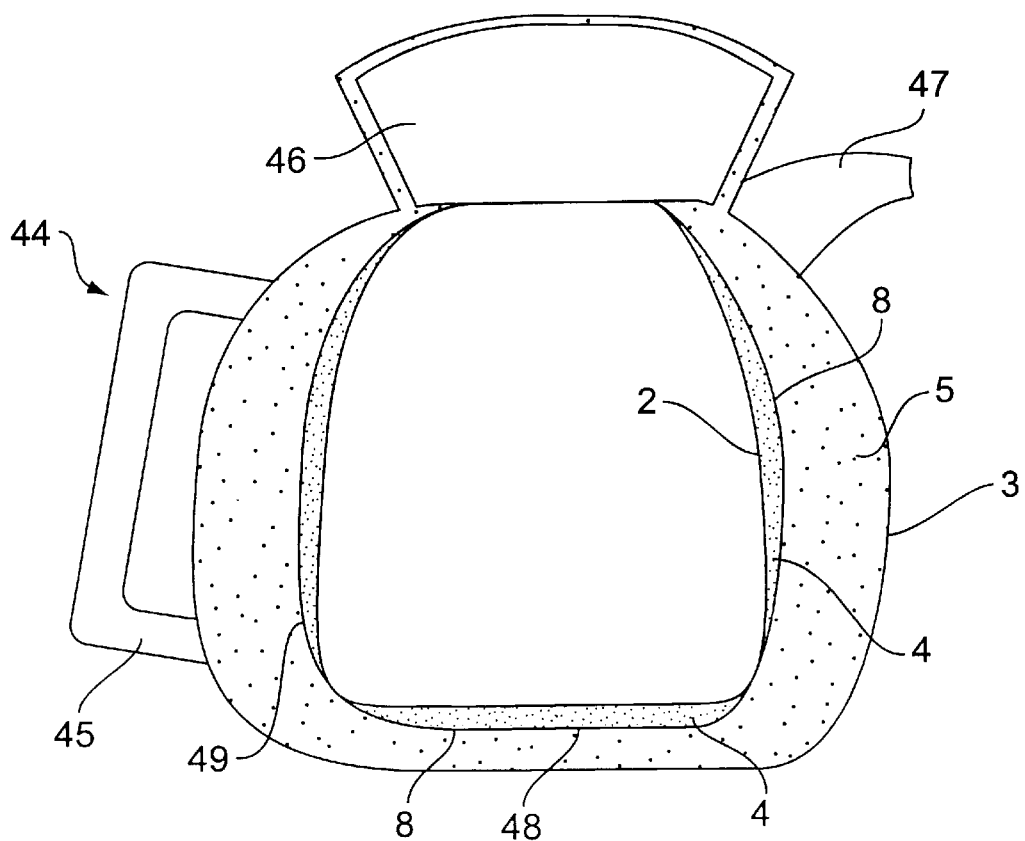
FIG. 8 is a cross-sectional view of a carafe according to the invention.

FIG. 8 shows a microwaveable heat retentive carafe in accordance with the invention, generally designated 44. Preferably, the carafe 44 comprises an inner shell 2, an outer shell 3, a microwave absorbing material 4, and an insulating material 5. The carafe also comprises a handle 45 for ease of use, a stopper 46, and a spout 47 to aid in pouring. In preferred embodiments, the 1.0 liter carafe has a 60-gram pouch 8 of microwaveable material in the base 48 and two 30-gram pouches 8 distributed evenly around the sides 49 of the carafe. Carafes with greater volumes, such as 48 and 64 fluid ounces are also contemplated. For the larger carafes, it would be preferable to use larger masses of microwaveable materials (such as four pouches having 60 grams of microwaveable material), and one of ordinary skill in the art would readily recognize how to do so based on the disclosure herein. The carafe may be preheated in a microwave oven prior to receiving its contents. Alternatively, the carafe may be filled and then heated together with its contents in a microwave oven.

Figure 9:
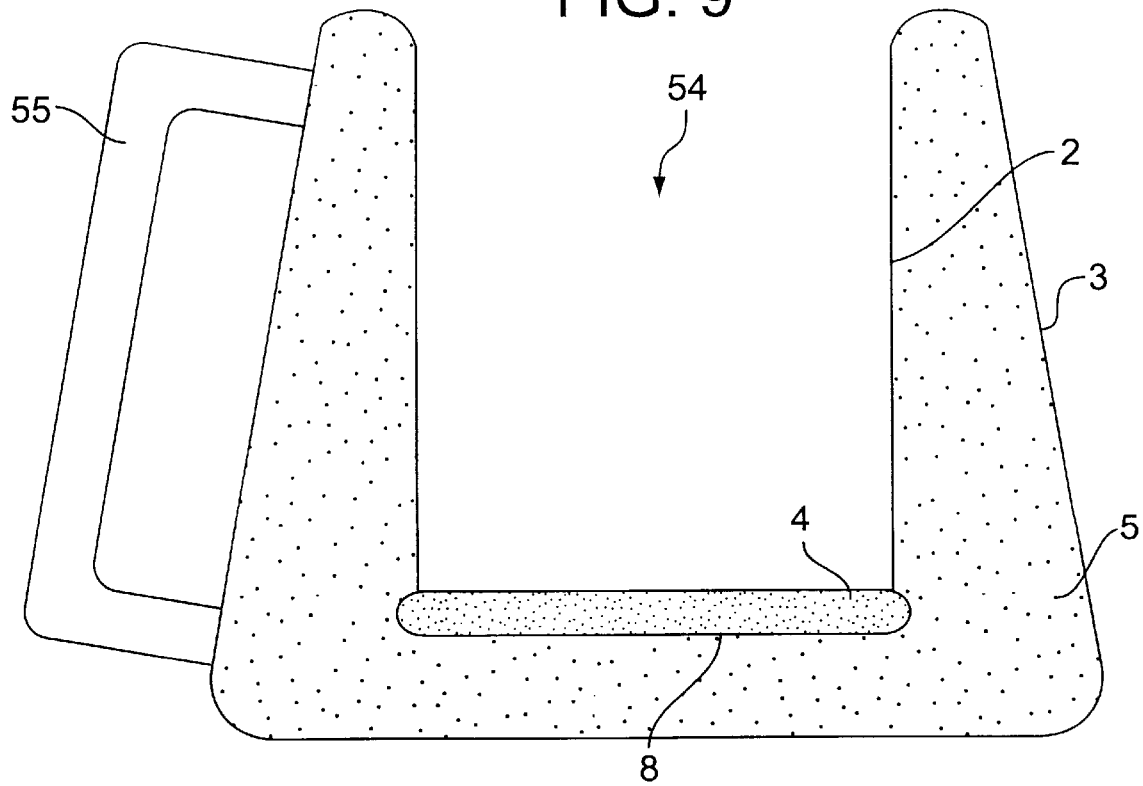
FIG. 9 is a cross-sectional view of a wide-bottom mug according to the invention.

FIG. 9 shows a microwaveable heat retentive wide-bottom mug in accordance with the present invention, generally designated 54. The wide-bottom mug 54 comprises an inner shell 2, an outer shell 3, a pouch 8 containing a microwave absorbing material 4, and an insulating material 5. In addition, the wide-bottom mug comprises a handle 55 for ease of use. In a preferred embodiment, the 12 to 16 fluid ounce capacity wide-bottom mug 54 has a single 60-gram pouch of microwave absorbing material in its base. In one embodiment, the wide-bottom mug may be preheated in a microwave oven prior to receiving its contents. In another embodiment, the wide-bottom mug may be filled and then heated together with its contents in a microwave oven.

Figure 10:
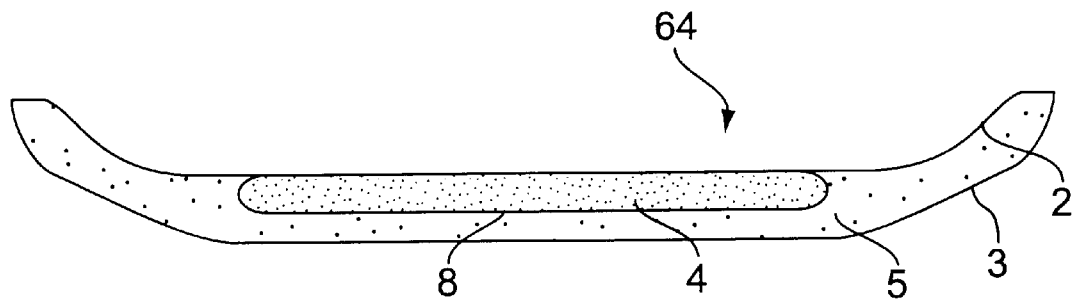
FIG. 10 is a cross-sectional view of a baby food serving dish according to the invention.

FIG. 10 shows another preferred embodiment, the microwaveable heat retentive baby food dish in accordance with the present invention, generally designated 64. The baby food dish 34 comprises an inner shell 2, an outer shell 3, a pouch 8 containing a microwave absorbing material 4, and an insulating material 5. In preferred embodiments, the baby food dish contains a 60-gram pouch in the base of the dish. Upon heating in a 750 watt microwave for approximately 2.5 minutes, the microwave absorbing material in the baby food dish heats up to approximately 57° C. to 63° C. In preferred embodiments, the baby food dish is preheated in a microwave oven, and then filled with baby food at ambient temperature. In this embodiment, the baby food dish warms the baby food to a temperature that is desirable, and maintains that temperature for a desirable period of time.

Figure 11:
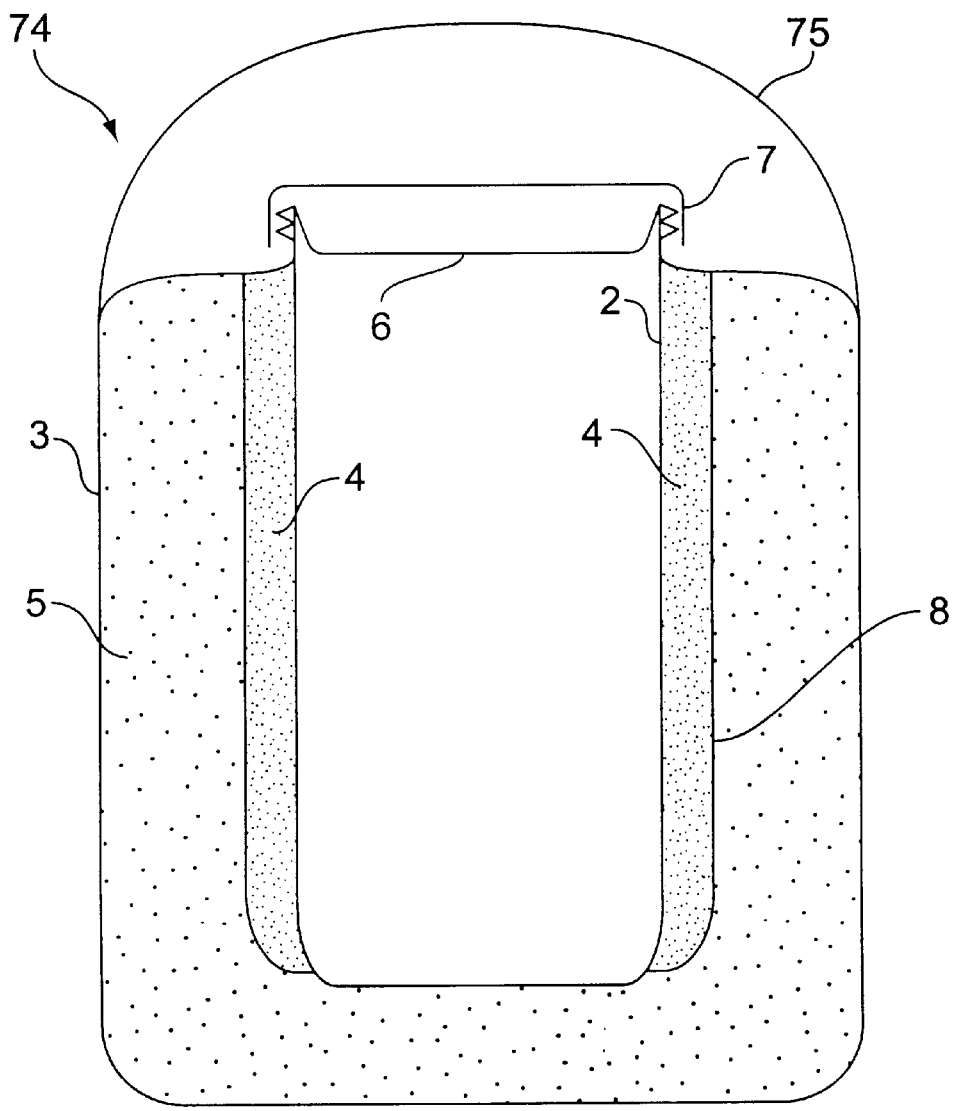
FIG. 11 is a cross-sectional view of a microwave heat retentive thermal bottle according to the invention.

FIG. 11 discloses an alternative embodiment of a microwaveable heat retentive thermal bottle in accordance with the present invention, generally designated 74. The thermal bottle preferably comprises an inner shell 2, an outer shell 3, a pouch 8 containing a microwaveable material 4, a foam insulating material 5, a stopper 6, and a lid 7. Additionally, the thermal bottle comprises a bowl-shaped lid 75, which can be taken off and used as a bowl for use in eating or drinking.

FIG. 12 discloses a pouch or envelope 8 containing a microwave absorbing material 4, the whole assembly generally designated 84. The edges 85 can be sealed with heat and pressure, or by any other means known in the art.

The foregoing specific embodiments are illustrative of applications in which the microwave absorbing compositions of the invention can be employed. Those of ordinary skill in the art will readily understand that other applications are suitable for the microwave absorbing material of the invention as well. Thus, the invention can be employed to keep the contents of the otherwise conventional coolers, such as picnic coolers, and ice chests, warm, or at elevated temperatures for extended time periods.

Additionally, the invention can also be employed to warm mittens or gloves, boots, scarves, etc. In certain applications, the pouch of the present invention can be employed as an insert for clothing, e.g., scarves, jackets, etc.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever.

EXAMPLES

Example 1

Thermal Efficiency Comparison

The thermal efficiency of a thermal retentive food jar, i.e., a glass vacuum bottle commercially available from Aladdin Industries, Nashville, Tenn., under the trade name WIDE MOUTH was compared to the thermal efficiency of a WIDE MOUTH glass vacuum bottle modified in accordance with the invention as set forth below. The glass vacuum bottle employed for this example employed a metallized lining.

For purposes of this example, the glass liner portion of the jar was removed and replaced with a plastic liner formed of polypropylene available from Amoco Plastics. Prior to being inserted, the liner was wrapped with a pouch or envelope containing 60 grams of glyceryl monostearate. The particular glyceryl monostearate employed was 18-06 MYVACE available from Eastman Chemical. The pouch was fabricated by surrounding the particular glyceryl monostearate in sheet material formed of polyester, and heat sealed at the edge so as to form a sealed envelope or pouch containing the glyceryl monostearate. The particular envelope material employed was commercially available at retail grocery stores under the trademark FOODSAVER. After being surrounded with the pouch described above, the liner was inserted within the outer shell of the container and the space defined by the inner liner and outer shell was filled with foamable foam polyurethane insulation. The resultant jar had a structure schematically illustrated in FIG. 11.

Figure 2:
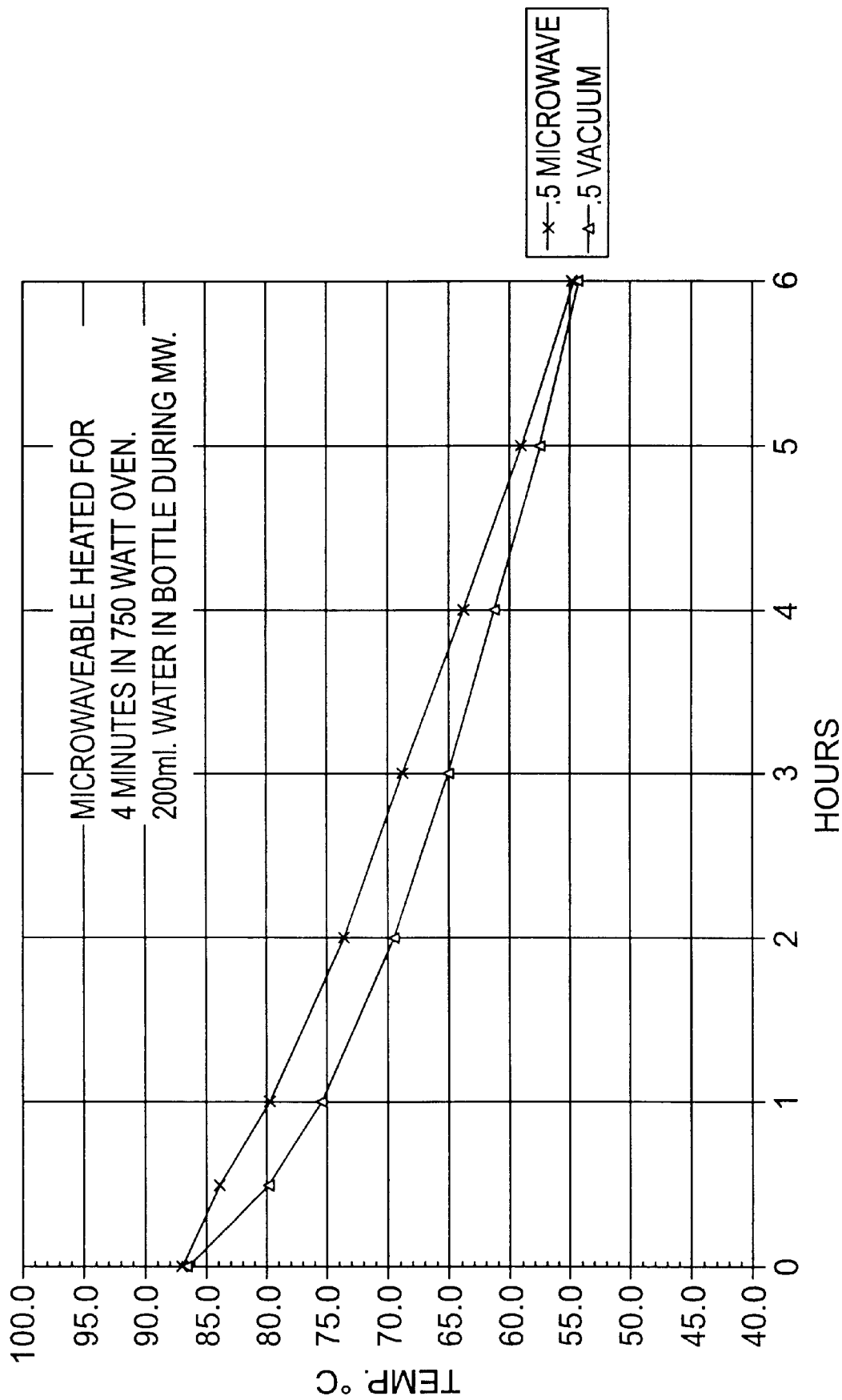
FIG. 2 is a graph of the thermal efficiency of a 0.5 liter heat retentive food jar using a glyceryl monostearate pouch according to the present invention, compared to a 0.5 liter food jar insulated by a metallized glass vacuum according to the prior art.

The thermal efficiency of each of the above jars was measured according to the following procedure: 3 to 4 ounces of water was placed into the microwave container. The container was heated in a 750 watt microwave oven at full power for approximately 4 minutes. The container was removed from the oven and the emptied. The container was then filled to capacity with hot water at 85° C., and stoppered. The temperature was recorded at 30 minutes, 60 minutes, and every hour thereafter, until six hours had elapsed from the heating time. The results were compared with those using a vacuum insulated container, described above, which can be considered to be substantially identical to the invention in all respects except that container utilizes a glass vacuum liner for thermal insulation. The results of this test are disclosed in FIG. 2. As shown in FIG. 2, the glyceryl monostearate employed exhibits a time/temperature profile which does not exhibit characteristic perturbations normally associated with materials whose time/temperature profile is phase change dependent such as microcrystalline waxes.

Alternatively, the performance of the microwave container can be tested by filling the container to capacity with water at ambient temperature. The container is then placed in a 750 watt microwave oven and heated at full power for 4 to 6 minutes. The stopper is affixed, and the temperature is then recorded each hour for a total of six hours.

The preceding examples can be repeated with similar success by substituting the generically and specifically described constituents and/or operating conditions of this invention for those used in the preceding examples. From the foregoing descriptions, one skilled in the art can easily ascertain the essential characteristics of this invention, and without departing from the spirit and scope thereof, can make various changes and modifications of the invention to adapt it to various usages and conditions.

What is claimed is:

1. A microwaveable heat retentive container comprising at least one portion for receiving a material; and
   a microwave absorbing material in heat exchange communication with said at least one portion, said microwave absorbing material comprising a member selected from the group consisting of glyceryl monostearate, glyceryl monopalmitate, and mixtures thereof.

2. The microwaveable heat retentive container of claim 1, wherein the microwave absorbing material comprises glyceryl monostearate.

3. The microwaveable heat retentive container of claim 1, wherein the microwave absorbing material comprises glyceryl monopalmitate.

4. The microwaveable heat retentive container of claim 1, wherein said microwave absorbing material is disposed within a microwave absorbing material storage volume.

5. The microwaveable heat retentive container of claim 4, wherein said microwave absorbing material storage volume comprises a substantially tubular portion.

6. The microwaveable heat retentive container of claim 4, wherein said microwave absorbing material storage volume comprises a substantially annular portion.

7. The microwaveable heat retentive container of claim 4, wherein the microwave absorbing material storage volume comprises a pouch.

8. The microwaveable heat retentive container of claim 7, wherein said pouch is formed from a material comprising polypropylene.

9. The microwaveable heat retentive container of claim 7, wherein said container comprises
   (a) an inner shell forming a shape adapted to receive a food or beverage product, and
   (b) an outer shell associated with said inner shell and forming a cavity therebetween; and said pouch is disposed in said cavity.

10. The microwaveable heat retentive container of claim 9, wherein the microwave absorbing composition comprises glyceryl monostearate.

11. The microwaveable heat retentive container of claim 9, wherein the cavity further comprises an insulating element to reduce outward radiant heat loss.

12. The microwaveable heat retentive container of claim 11, wherein the insulating element comprises insulating foam material.

13. The microwaveable heat retentive container of claim 12, wherein the insulating foam material comprises polyurethane foam.

14. The microwaveable heat retentive container of claim 1, wherein said container includes a bottom wall portion and said microwave absorbing material is associated with said bottom wall portion.

15. The microwaveable heat retentive container of claim 14, wherein said bottom wall portion includes a cavity and said microwave absorbing material is disposed within said cavity.

16. A microwave absorbing pouch comprising walls formed of a microwave transparent material constructed and arranged to retain a particulate material and a microwave absorbing material disposed in the microwave transparent pouch, wherein the microwave absorbing material is selected from the group consisting of glyceryl monostearate, glyceryl monopalmitate, and mixtures thereof.

17. The microwave absorbing pouch of claim 16 wherein the walls formed of a microwave transparent material comprise marginal portions, and the walls are secured to each other at the marginal portions.

18. The microwave absorbing pouch of claim 17, wherein the walls formed of a microwave transparent material are secured to each other at the marginal portions by heat sealing.

19. The microwave absorbing pouch of claim 18, wherein the walls formed of a microwave transparent material comprise polypropylene.

20. In combination:
   a microwaveable container; and
   a microwave absorbing pouch comprising walls formed of a microwave transparent material constructed and arranged to retain a particulate material, and a microwave absorbing material disposed in the microwave pouch, wherein the microwave absorbing material is selected from the group consisting of glyceryl monostearate, glyceryl monopalmitate, and mixtures thereof.

* * * * *